United States Patent [19]

Iftikar et al.

[11] 4,367,502
[45] Jan. 4, 1983

[54] FIXED HARD DISC DRIVE ASSEMBLY AND CLEAN AIR SYSTEM

[75] Inventors: Syed H. Iftikar, Fremont; David L. Reeck, San Jose, both of Calif.

[73] Assignee: Shugart Technology, Scotts Valley, Calif.

[21] Appl. No.: 139,200

[22] Filed: Apr. 11, 1980

[51] Int. Cl.³ .................... G11B 17/26; G11B 23/02
[52] U.S. Cl. ........................................ 360/98; 360/133
[58] Field of Search ............................... 360/97–99, 360/133, 102

[56] References Cited

U.S. PATENT DOCUMENTS

| | | | |
|---|---|---|---|
| 3,706,085 | 12/1972 | Mowrey et al. | 360/97 |
| 3,825,951 | 7/1974 | Katsumori et al. | 360/98 |
| 4,092,687 | 5/1978 | Butsch | 360/97 X |
| 4,130,845 | 12/1978 | Kulma | 360/98 X |
| 4,185,308 | 1/1980 | Fujioka | 360/133 X |
| 4,208,678 | 6/1980 | Lamans | 360/102 X |
| 4,216,512 | 8/1980 | Vidwans | 360/133 |

FOREIGN PATENT DOCUMENTS 54-130917 10/1979 Japan ............................. 360/98

Primary Examiner—John H. Wolff
Attorney, Agent, or Firm—Flehr, Hohbach, Test, Albritton & Herbert

[57] ABSTRACT

A disc drive assembly including a main housing containing a plurality of stacked discs supported on a rotating spindle is disclosed herein. This assembly also includes an air filter arrangement which defines a path of circulating air confined to a generally planar area within the housing. The support spindle includes a slot and an array of holes for directing the circulating air towards the discs in order to provide thermal balance.

4 Claims, 3 Drawing Figures

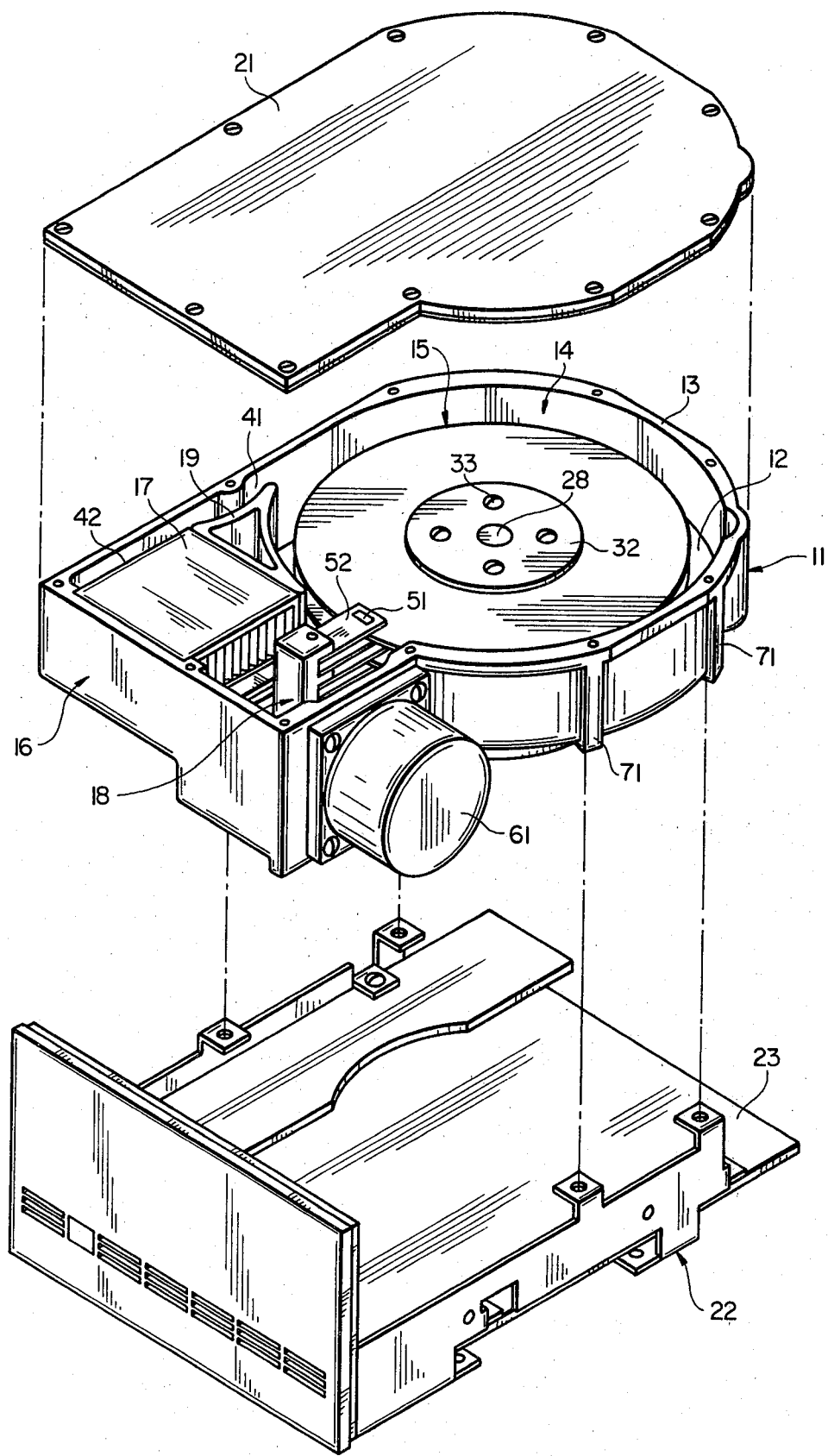
FIG_1

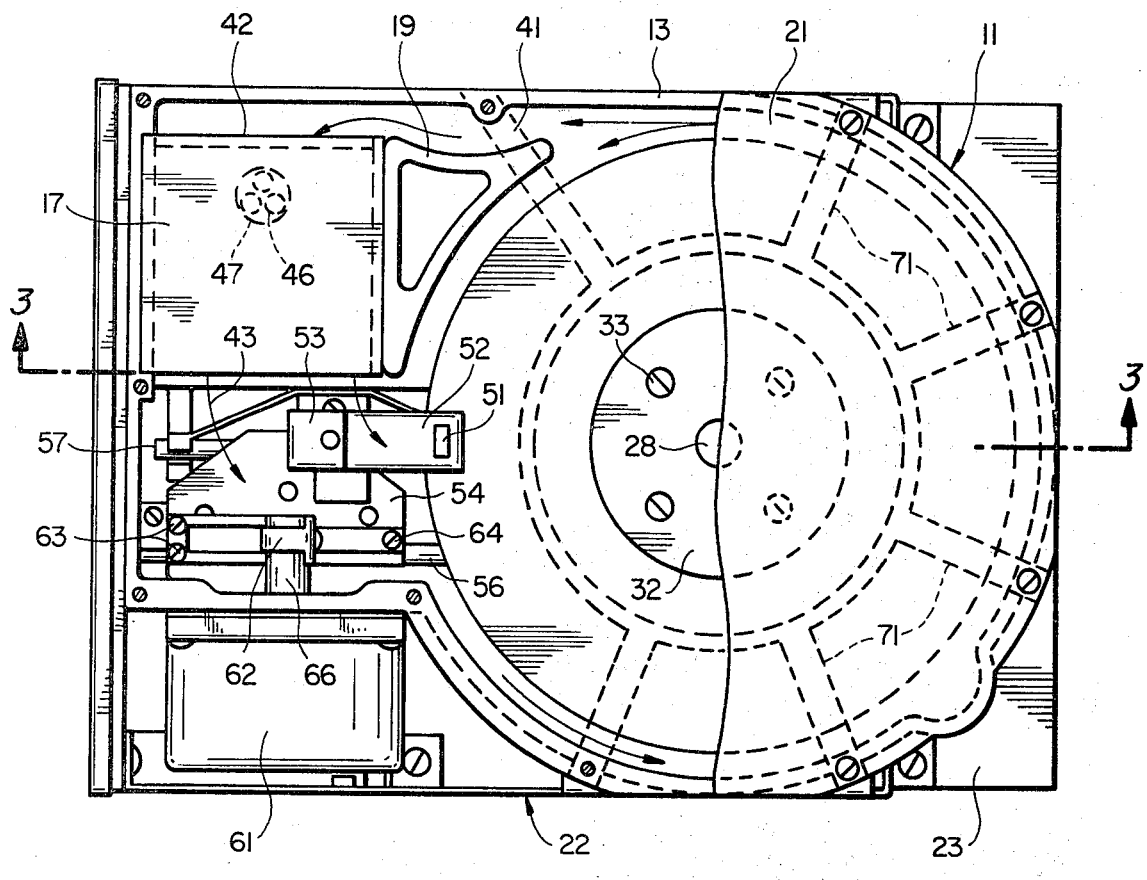
FIG_2
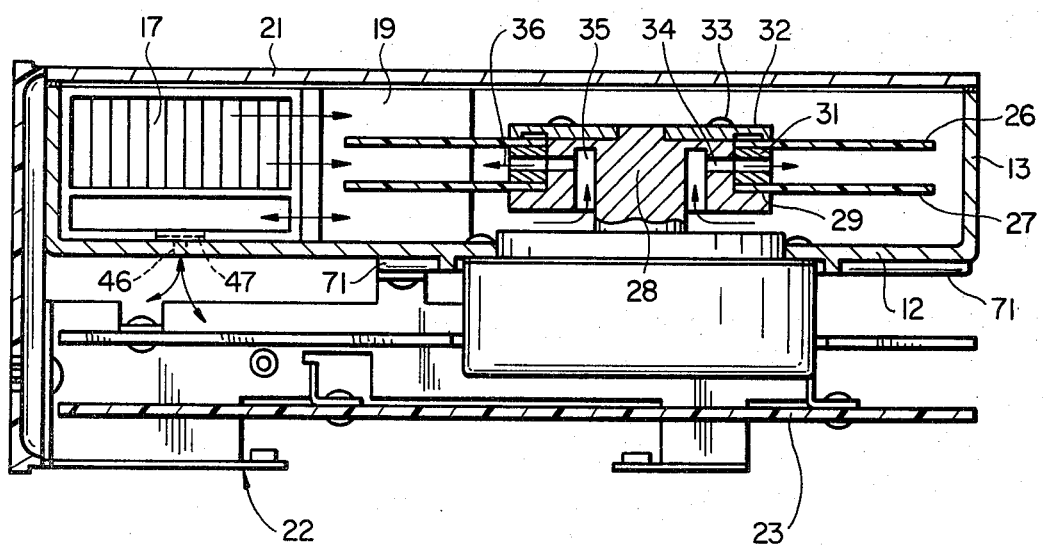
FIG_3

FIXED HARD DISC DRIVE ASSEMBLY AND CLEAN AIR SYSTEM

This invention relates generally to a fixed hard disc drive and more particularly to a fixed hard disc drive including a hermetically sealed housing with an air cleaning means.

Floppy disc drives are extensively used in connection with microcomputers, minicomputers, word processing equipment and related equipment for data storage and data handling applications. In many such applications there is a requirement for a compatible drive having a higher storage capacity. Hard disc storage media has the capacity for such higher density storage.

It is a general object of the present invention to provide a fixed hard disc drive assembly which is plug compatible with conventional floppy disc drives.

The floppy discs are generally housed in an envelope which can be removably inserted in the disc drive apparatus. The discs are not adequately protected from dust or other physical contaminants. However, because of their low storage density, there is negligible interference with operation by contaminants such as dust. However, as is well known, when high density discs are employed, care must be taken to minimize contaminants such as dust and the like. In such equipment the read-write heads are disposed very close to the disc surface during the read-write operations. The heads are properly positioned and loaded so that as the disc rotates, the heads are maintained in close proximity to the discy by an air layer. The force is such as to override the force of the air which is generated by the rotating disc. Any particles on the surface of the disc will interfere with the spacing of the heads and prevent proper operation. In many instances, dust particles or the like may lodge between the disc surface and the associated read-write head and cause a crash.

Contaminant problems are minimized by housing the discs in a hermetically sealed housing and providing clean air circulation over the disc surface to cleanse the surface. A clean air system used in connection with disc packs disposed within an enclosure is described in U.S. Pat. No. 3,846,835.

It is another object of the present invention to provide a disc drive in which hard discs are mounted for rotation within a hermetically sealed housing which includes means for cleansing recirculating air and for maintaining atmospheric pressure within the housing.

It is another object of the present invention to provide a disc drive assembly in which the head drive means and disc drive means are externally mounted on the housing which houses the air cleaning means, magnetic heads and discs.

The foregoing and other objects of the invention are achieved by a disc drive assembly having a housing which includes a cylindrical portion and a rectangular portion. A plurality of discs are supported on a drive shaft for rotation in the cylindrical portion and an external disc drive means drives the shaft. A filter is disposed at one end of the rectangular portion and has an input side disposed to receive air which is pumped by the rotating discs and provides clean air to the center of the disc and spindle whereby the air can travel outwardly over the surface of the disc to cleanse the same. A plurality of magnetic heads are supported in cooperative relationship with the surface of the disc and a head support and drive assembly disposed at the other end of the rectangular housing serve to move the heads into cooperative relationship with the discs. An external motive means serves to drive the heads so that the heads may be positioned at various radial locations on the surface of the associated disc.

The foregoing and other objects of the invention will be more clearly understood from the following description when taken in connection with the accompanying drawings.

Referring to the drawings:

FIG. 1 is an exploded perspective view of a disc drive assembly in accordance with the present invention.

FIG. 2 is a plan view illustrating the air circulation.

FIG. 3 is a sectional view taken along the line 3—3 of FIG. 2 showing the air circulation from the center of the disc outwardly along the surfaces.

Referring to the figures, the disc drive assembly includes a housing 11 having a base 12 with upwardly extending sides 13. The configuration of the housing portion includes a cylindrical portion designated generally by numeral 14 adapted to receive a plurality of discs 15 and a rectangular portion designated generally by numeral 16 and including a filter assembly 17 at one end and a head drive assembly designated generally at 18 at the other end. Preferably, the filter 17 is a high efficiency filter with a relatively low pressure differential capable of filtering particles as small as 0.3 microns. An internal wall 19 serves to provide means for mounting the filter assembly 17 and for forming part of the cylindrical portion of the housing. A cover 21 is adapted to fit onto the housing walls and secured thereto to provide a hermetically sealed housing. The housing houses the discs, the filter assembly and the transducer drive assembly.

The housing is mounted on a chassis 22 which may accommodate a circuit board 23 including all of the electronic components necessary to control operation of the means for driving the discs and the magnetic heads.

Referring now more particularly to FIGS. 2 and 3, the fixed hard discs 26 and 27 are mounted on a spindle 28 which includes a shoulder 29 for receiving one surface of the disc 27. A ring-shaped spacer 31 is mounted on the other surface of the disc and serves to receive the disc 26. A disc-shaped retainer 32 is secured by a plurality of screws 33 to the top of the spindle to securely hold the discs 26, 27 in spaced relationship with respect to one another. The spindle includes a cylindrical groove 35 which extends upwardly to define a space which communicates with radially extending holes or openings 34 which direct circulating air outwardly as shown by the arrows 36. The flow of air between the discs 26, 27 eliminates stagnant air and minimizes thermal gradients. When the spindle and disc are rotated at high velocities, air flows radially and circumferentially outwardly due to the pressure differential caused by the centrifugal pumping effect of the disc. Thus, there is provided a cleansing layer of air on surfaces of the disc. The centrifugal action gives a circumferential component of velocity to the air whereby it travels into the space 41 between the wall 19 and the housing 13 into the intake side 42 of the filter 17. The air cleansed by the filter travels outwardly as shown by the arrows 43 to return to the center of the low pressure area at the center of the discs caused by centrifugal forces.

When atmospheric pressures change, the pressure within the housing is maintained at atmospheric pressure by means of an opening 46 which includes a filter 47 whereby as pressure changes occur, air flows inwardly or outwardly to equalize pressure.

As will be more particularly described in connection with copending application, Ser. No. 139,428 filed Apr. 11, 1980 *there is provided means for holding and moving magnetic heads 51 in cooperation with the surfaces of the disc. The magnetic heads 51 are mounted upon a head mount 52 which is secured to a mounting block 53 carried on a carriage 54. The carriage is supported on a pair of parallel rails 56 and 57, one of which is spring-loaded. Spaced bearings ride on the rails to provide linear motion. A stepping motor 61 drives the carriage by means of a band 62 which has its two ends secured to the rail by means of screws 63 and 64 and which is secured to the motor shaft 66 whereby rotation of the shaft will wind the thin portion of the band onto and off of the shaft and cause the carriage to move linearly along the rails 56,57. This movement serves to move the magnetic head inwardly and outwardly radially along the surfaces of the disc. The operation of the magnetic head transport system as just described is more clearly described in the aforesaid copending application.
*filed simultaneously herewith In accordance with the preferred embodiment of the present invention, the housing is made of a casting and includes ribs 71 which provide heat transfer to the surounds.

Thus, there has been provided a hard disc drive assembly which is a compact plug compatible with current floppy disc drives, includes a housing for housing the discs and head drive, provides air circulation for cleaning the surface of the disc, cleans the air efficiently and maintains atmospheric pressure within the housing.

What is claimed is:

1. A disc drive assembly comprising a housing having a, planar base, and upwardly extending sides and an enclosing cover, said housing including a cylindrical portion and a rectangular portion, an external disc drive motor secured to said base outside said housing and having a drive shaft extending into the cylindrical portion of said housing, a drive spindle secured to and supported from said shaft within the cylindrical portion of said housing, said spindle serving to receive and support a plurality of discs in spaced relationship to one another whereby they are driven by the disc drive motor for rotation in the cylindrical portion of said housing, an air filter assembly disposed at one end of said rectangular portion of said housing on said base and having an input side disposed to receive air centrifugally pumped by said rotating discs and provide clean air to the center of the discs at the drive spindle, said air defining a circulation path being substantially confined to the generally planar area within said housing, a head support and drive assembly disposed in the other end of said rectangular housing portion, a plurality of magnetic head supported by said head support to cooperate with the surfaces of said discs, a head drive motor mounted on the side of said housing and having its shaft extending into the other end of said rectangular portion of said housing for cooperating with the drive assembly to drive the heads, and said spindle including a cylindrical slot and a plurality of radially extending holes for providing circulation of the air upwardly along said cylindrical slot and outwardly through said holes toward said discs, thereby providing thermal balance.

2. A disc drive assembly as in claim 1 including a port formed in said housing and filter means disposed in said port whereby air may flow in and out of said housing depending upon the pressure in the housing.

3. A disc drive assembly as in claim 1 in which housing includes a plurality of exterior ribs serving to provide heat transfer to the surrounds.

4. A disc drive assembly as in claim 1 including an internal wall for partly defining the cylindrical and rectangular portions of the housing and guiding air from the cylindrical portion of the housing to the filter in the rectangular portion of the housing.

* * * * *